(12) United States Patent
Grigg et al.

(10) Patent No.: US 9,514,463 B2
(45) Date of Patent: Dec. 6, 2016

(54) DETERMINATION OF CUSTOMER PRESENCE BASED ON COMMUNICATION OF A MOBILE COMMUNICATION DEVICE DIGITAL SIGNATURE

(71) Applicant: Bank of America Corporation, Charlotte, NC (US)

(72) Inventors: David M. Grigg, Rock Hill, SC (US); Richard Andrew Starbuck, Walnut Creek, CA (US); Carrie Anne Hanson, Charlotte, NC (US); Alicia C. Jones-McFadden, Fort Mill, SC (US); Nathan Dent, Concord, NC (US); Nicholas Munson, Charlotte, NC (US); Matthew K. Bryant, Gastonia, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 14/856,017

(22) Filed: Sep. 16, 2015

(65) Prior Publication Data
US 2016/0005048 A1 Jan. 7, 2016

Related U.S. Application Data

(63) Continuation-in-part of application No. 14/251,094, filed on Apr. 11, 2014.

(51) Int. Cl.
*G06Q 30/00* (2012.01)
*H04W 4/00* (2009.01)
(Continued)

(52) U.S. Cl.
CPC ............ *G06Q 30/01* (2013.01); *G02B 27/017* (2013.01); *H04M 1/72572* (2013.01);
(Continued)

(58) Field of Classification Search
USPC ........................................................ 705/304
See application file for complete search history.

(56) References Cited

U.S. PATENT DOCUMENTS

| 7,349,557 B2 | 3/2008 | Tibor |
| 7,398,253 B1 | 7/2008 | Pinnell |

(Continued)

OTHER PUBLICATIONS

U.S. Appl. No. 14/251,094, filed Apr. 11, 2014, Grigg, David M. et al., entitled, Customer Recognition Through Use of an Optical Head-Mounted Display in a Wearable Computing Device.
(Continued)

*Primary Examiner* — Jason Olson
*Assistant Examiner* — Deeprose Subedi
(74) *Attorney, Agent, or Firm* — Michael A. Springs; Moore & Van Allen PLLC; James C. Edwards (57) ABSTRACT

Systems, apparatus, and computer program products provide for monitoring an area within or proximate to a place of business for digital signatures of mobile communication devices, such as cellular devices or wearable communication devices. The captured digital signatures are then matched to digital signatures associated with existing customers of the business to determine the presence of the existing customer within or proximate to the place of business. Once the presence of the existing customer within or proximate to the business is known, the business can access other relevant information, such as customer profile information, prior transaction/interaction information or the like to enhance the customer's current interaction with the business. Moreover, once the presence of the existing customer is known, location determining mechanisms may implemented to track the location of the known customer within or proximate to the place of business for the purpose of positively identifying the known customer.

20 Claims, 4 Drawing Sheets

(51) Int. Cl.
*H04W 4/02* (2009.01)
*H04M 1/725* (2006.01)
*H04W 4/20* (2009.01)
*G02B 27/01* (2006.01)

(52) U.S. Cl.
CPC .......... *H04W 4/008* (2013.01); *H04W 4/023* (2013.01); *H04W 4/206* (2013.01); *G02B 2027/014* (2013.01); *G02B 2027/0138* (2013.01); *G02B 2027/0178* (2013.01); *G02B 2027/0187* (2013.01)

(56) References Cited

U.S. PATENT DOCUMENTS

| | | | |
|---|---|---|---|
| 7,606,770 | B2 | 10/2009 | Pinnell |
| 7,716,129 | B1 | 5/2010 | Tan et al. |
| 8,184,070 | B1 | 5/2012 | Taubman |
| 8,485,422 | B2 | 7/2013 | Rometty et al. |
| 8,490,865 | B2 | 7/2013 | Randazza et al. |
| 8,500,031 | B2 | 8/2013 | Naelon |
| 8,559,924 | B1 | 10/2013 | Henderson |
| 2008/0126116 | A1 | 5/2008 | Singhai |
| 2009/0300744 | A1 | 12/2009 | Guo et al. |
| 2010/0146263 | A1 | 6/2010 | Das et al. |
| 2011/0166869 | A1 | 7/2011 | Froelich |
| 2012/0030043 | A1 | 2/2012 | Ross et al. |
| 2012/0050144 | A1 | 3/2012 | Morlock |
| 2012/0203700 | A1 | 8/2012 | Ornce et al. |
| 2013/0042314 | A1 | 2/2013 | Kelley |
| 2013/0054473 | A1* | 2/2013 | Jan .................. G06Q 20/40975 705/71 |
| 2013/0110658 | A1 | 5/2013 | Lyman et al. |
| 2013/0208234 | A1 | 8/2013 | Lewis |
| 2013/0212024 | A1 | 8/2013 | Mattsson et al. |
| 2013/0242262 | A1 | 9/2013 | Lewis |
| 2013/0246203 | A1 | 9/2013 | Laracey |
| 2013/0246258 | A1 | 9/2013 | Dessert |
| 2013/0246260 | A1 | 9/2013 | Barten et al. |
| 2014/0006190 | A1 | 1/2014 | Loomis, III et al. |
| 2014/0122344 | A1 | 5/2014 | Foulds et al. |
| 2014/0160157 | A1 | 6/2014 | Poulos et al. |
| 2014/0306994 | A1* | 10/2014 | Brown .................. G06T 19/006 345/633 |
| 2014/0344153 | A1 | 11/2014 | Raj et al. |

OTHER PUBLICATIONS

U.S. Appl. No. 14/251,351, filed Apr. 11, 2014, Grigg, David M. et al., entitled, User Authentication by Operating System-Level Token.
U.S. Appl. No. 14/251,291, filed Apr. 11, 2014, Grigg, David M. et al., entitled, User Authentication by Token and Comparison to Visitation Pattern.
U.S. Appl. No. 14/250,972, filed Apr. 11, 2004, Grigg, David M. et al., entitled, Security Monitoring Implementing Customer Recognition Via an Augmented Reality Display.

* cited by examiner

DETERMINATION OF CUSTOMER PRESENCE BASED ON COMMUNICATION OF A MOBILE COMMUNICATION DEVICE DIGITAL SIGNATURE

CROSS-REFERENCE TO RELATED APPLICATION

This application is a Continuation-In-Part (CIP) of co-pending U.S. patent application Ser. No. 14/251,094, filed Apr. 11, 2014, entitled "Customer Recognition through use of an Optical Head-Mounted Display in a Wearable Computing Device", assigned to the same inventive entity; the entire disclosure of which is incorporated herein by reference as if set forth herein.

FIELD

In general, embodiments of the invention relate to mobile communication systems and, more particularly, automatically determining the presence of established customers based on communication of a digital signature associated with a mobile communication device in possession of the customer.

BACKGROUND

In many business settings, such as with a retail store environment or a banking center, an associate/employee of the business benefits from knowing which of the individuals/customers are pre-existing or established customers of the business. However, unless the associate/employee visually recognizes the established customer from previous business encounters or the like, the associate/employee has no means of identifying established customers, absent some form of identifying action on behalf of the established customer. For example, grocery stores customers may present a loyalty card prior to completing a purchase or banking customers may authenticate themselves as established customers (e.g., present debit/credit card and provide requisite Personal Identification Number (PIN) prior to conducting a transaction at a teller station. However, such identification of the established customer not only requires action on behalf of the customer but is performed at or proximate to the time at which the established customer transacts. In many instances, the business associate/employee desires or would benefit from knowing which individuals are customers when the customer enters the business environment or shortly thereafter to ensure that the established customer is given proper deference or the like.

In addition to having a desire to know which of the individuals in the business environment are established customers when the individuals enter or are near the business environment absent overt actions by the customer to identify themselves, the associate/employee also desires and/or benefits from having ready access to other information about the customer, such as customer status, customer affinities, customer relationship (e.g., previous transactions and/or accounts held by the customer) and the like. This information may be desired by the associate/employee to better serve the established customer and to personalize the customer's experience with the business. However, current means of obtaining such information, such as having the associate/employee access a computer in order to look up a customer profile in a business database are impractical and inefficient, since the associate/customer has to adhere to other job responsibilities/functions.

Therefore, a need exists to develop systems, apparatus, methods, computer program products and the like that automatically, without requiring an action on behalf of the customer and/or associate, identify which individuals/customers within or proximate to a business location are established customers of the business. In addition, a need exists to identify the established customers at the onset of the established customer's presence at or near the business so as to ensure that the customer is given proper attention and service. In addition to identifying established customers, a need exists to provide immediate and/or on-demand access to information associated with established customers, such as customer status (e.g., VIP status or the like), customer relationship, customer affinities or the like so that the business associates can better address the established customer's needs and better the customer's experience at the business location.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, computer program products or the like for automatically determining which individuals within a business environment, such as a retail store, banking center or the like, are established customers (i.e., have conducted transactions with the business in the past and/or hold accounts at the business). Such a determination of established customer status is conducted without requiring any action on behalf of the individuals/customers currently located within the business environment and can be accomplished when the established customer enters the business location or shortly thereafter. In addition to identifying those individuals within the business environment that are established customers and providing such information to requisite business associates/employees, the present invention also provides for immediate access or visibility to other information related to the established customers relationship with the business, such as customer status, customer affinities, previous customer dealings/transactions, accounts held by the customer and the like.

A system for identifying a presence of established customers within or proximate to a location of a business defines first embodiments of the invention. The system includes a customer identifier database that stores, in first memory, a listing that correlates established customers to one or more digital signatures, each digital signature linked to a mobile communication device known to be associated with an established customer. The system further includes a computing platform having a second memory and at least one processor in communication with the second memory and a customer presence determining module that is stored in the second memory and executable by the processor.

The customer presence determining module is configured to monitor an area within or proximate to the location of the business for short-range wireless communication signals that include digital signatures of mobile communication devices located within or proximate to the business location and, in response to receiving a wireless communication signal that includes a digital signature, access the customer identifier database. Accessing the database includes comparing the digital signature to the digital signatures in the listing, and, in response to the comparison determining that the digital signature is within the listing, identify the established customer associated with the digital signature. In response to identifying the established customer, the module is further configured to communicate a first notification to at least one entity within the business that indicates a presence of the established customer within or proximate to the location of the business.

In further specific embodiments of the system, the customer presence determining module is further configured, in response to identifying the established customer associated with the digital signature, track a location of the established customer within or proximate to the location of the business. In such embodiments of the system, the customer presence determining module further comprises a user interface application that is configured to provide a user a display of the area within or proximate to the location of the business, wherein the display provides for tracking location of the established customer within the area.

In other embodiments the system includes a financial transaction database that includes financial transaction history for each of a plurality of established customers of the business. In such embodiments of the system, the customer presence determining module is further configured to, in response to identifying the established customer associated with the digital signature, access the financial transaction database to identify at least a portion of the financial transaction history of the established customer, and communicate the first notification to the at least one entity within the business that additionally indicates information associated with the financial transaction history of the established customer.

In additional embodiments of the system the customer presence determining module is further configured to, based on (1) the presence of the established customer within or proximate to the location of the business, and (2) the financial transaction history of the established customer, generate and initiate communication of a security alert that indicates a discrepancy between a location of one or more recent financial transaction conducted by the established customer and current presence of the established customer within or proximate to the location of the business.

In still further embodiments of the system the customer presence determining module is further configured to in response to identifying the established customer, track a duration of the presence of the established customer within or proximate to the location of the business. In such embodiments of the system the customer presence determining module is further configured to, in response to identifying the established customer and tracking the duration of the presence, communicate the first notification to at least one entity within the business that indicates a presence of the established customer within or proximate to the location of the business for a predetermined duration of time.

Moreover, in further specific embodiments of the system, the customer presence determining module is further configured to, in response to receiving the wireless communication signal that includes a digital signature, access the customer identifier database to compare the digital signature to the digital signatures in the listing, and, in response to the comparison determining that the digital signature is not within the listing, identify a user associated with the digital signature as a potential new customer of the business.

Further, in response to identifying the user as a potential new customer of the business, communicate a second notification to at least one entity within the business that indicates a presence of the potential new customer.

Additional embodiments of the system are directed to the customer presence determining module being further configured to monitor the area within or proximate to the location of the business for short-range wireless communication signals that include digital signatures of mobile communication devices located within or proximate to the business location, wherein the short-range wireless communication signals are communicated from the mobile communication devices (1) absent user-input, and (2) based on the mobile communication device being located within predefined boundaries of the business location.

A computer-implemented method for identifying a presence of established customers within or proximate to a location of a business defines second embodiments of the invention. The method includes monitoring, by a computing device processor, an area within or proximate to the location of the business for short-range wireless communication signals that include digital signatures of mobile communication devices located within or proximate to the business location. The method further includes, in response to receiving a wireless communication signal that includes a digital signature, accessing, by a computing device processor, a customer identifier database to compare the digital signature to a listing of digital signatures, wherein the listing correlates the digital signatures to established customers of the business. Further, the method includes, in response to the comparison determining that the digital signature is within the listing, identifying, by a computing device processor, the established customer correlated to the digital signature and, in response to identifying the established customer, communicating, by a computing device processor, a first notification to at least one entity within the business that indicates a presence of the established customer within or proximate to the location of the business.

A computer program product including a non-transitory computer-readable medium defines third embodiments of the invention. The computer-readable medium includes a first set of codes for causing a computer to monitor an area within or proximate to the location of the business for short-range wireless communication signals that include digital signatures of mobile communication devices located within or proximate to the business location, the computer-readable medium additionally includes a second set of codes for causing a computer to, in response to receiving a wireless communication signal that includes a digital signature, access a customer identifier database to compare the digital signature to a listing of digital signatures, wherein the listing correlates the digital signatures to established customers of the business. In addition, the computer-readable medium includes a third set of codes for causing a computer to, in response to the comparison determining that the digital signature is within the listing, identify the established customer correlated to the digital signature, and a fourth set of codes for causing a computer to, in response to identifying the established customer, communicate a first notification to at least one entity within the business that indicates a presence of the established customer within or proximate to the location of the business.

Thus, systems, apparatus, methods, and computer program products herein described in detail below provide for monitoring an area within or proximate to a place of business for digital signatures of mobile communication devices, such as cellular devices or wearable communication devices. The captured digital signatures are then matched to digital signatures associated with existing customers of the business to determine the presence of the existing customer within or proximate to the place of business. Once the presence of the existing customer within or proximate to the business is known, the business can access other relevant information, such as customer profile information, prior transaction/interaction information or the like to enhance the customer's current interaction with the business. Moreover, once the presence of the existing customer within or proximate to the business is known, location determining mechanisms may implemented to track the location of the known customer within or proximate to the place of business for the purpose of positively identifying the known customer.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for implementing a wearable computing device having an Optical Head-Mounted Display (OHMD) to automatically determine which individuals within a business environment, such as a retail store, banking center or the like, are established customers. Such a determination of established customer status is conducted without requiring any action on behalf of the individuals/customers currently located within the business environment and can be accomplished when the established customer enters the business location or shortly thereafter. Once established customers are identified, customer indicators are provided within the view of the OHMD, so that a business associate/employee can readily identify which individual within their field of view are established customers. In addition to identifying those individuals with the business environment that are established customers are providing such information to requisite business associates/employees, the present invention also provides for immediate access or visibility, via the OHMD, to other information related to the established customers relationship with the business, such as customer status, customer affinities, previous customer dealings/transactions, accounts held by the customer and the like.

Figure 1:
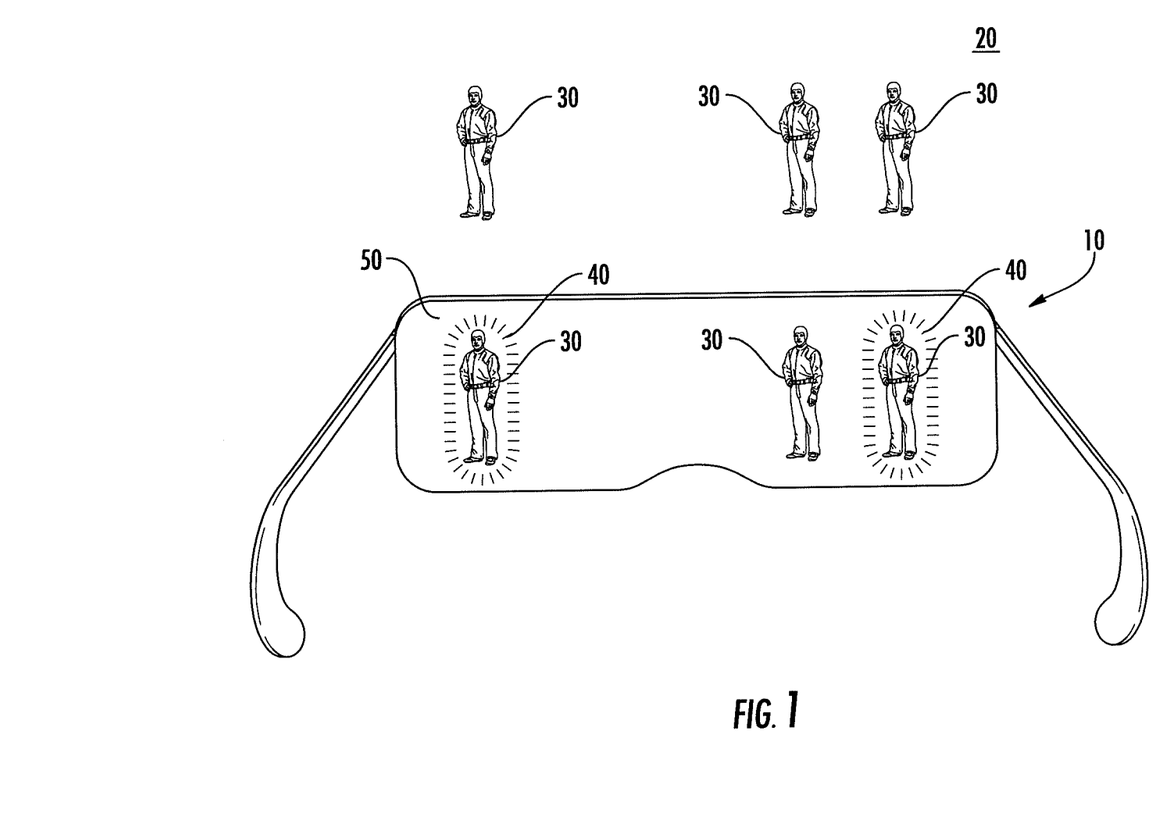
FIG. 1 provides a schematic view of a wearable computing device having an Optical Head-Mounted Display (OHMD) that is configured to present within the view of the OHMD customer identifiers in response to automatically identifying individuals as established customers, in accordance with embodiments of the present invention.

Referring to FIG. 1, a schematic diagram is presented of a wearable computing device 10 including an Optical Head-Mounted Display (OHMD) 50, in accordance with an embodiment of the present invention. The wearable computing device is conjured as eyewear that is worn by a user, in embodiments of the present invention, the wearable computing device is worn/used by an employee/associate of the business. The OHMD display 50 provides for the user to view the surrounding environment 20 in conjunction with display of data/information provided by the computing functionality of the wearable computing device 10. In the illustrated embodiment of the present invention the surrounding environment is a business location such as a retail store, a banking center or the like, which is occupied by one or more individuals 30. The individuals 30 may be new or potential customers of the business or the individuals may be established customers of the business (i.e., customers with a pre-existing relationship with the business, such as having conducted previous transactions with the business and/or having accounts with the business or the like).

In accordance with embodiments of the present invention, the wearable computing device 10 is configured to automatically (and without requiring action on the part of the individuals) identify which of the individuals being viewed through OHMD 50 are established customers. The means by which the individuals being monitored are identified as established customers are discussed in detail infra. In response to identification of the established customers, customer identifiers 40 are presented in the OHMD 50 of wearable computing device 10, such that employee/associate (not shown in FIG. 1) can readily comprehend which of the individuals within the view are established customers. In the illustrated embodiment of FIG. 1 the customer identifier 40 is graphically presented as an outline around the established customer that serves to accentuate the established customer in the OHMD 50. It should be noted that the customer identifier 40 make take on the form of any graphical indicator that differentiates the established customer from the other individuals within the display. In accordance with specific embodiments of the present invention, the graphical customer identifier 40 "attaches" to the established customer, such that as the established customer moves, as viewed through the OHMD 50, (or moves into and/or out of the display) the customer identifier 40 follows the established customer, thereby creating an augmented reality environment within the OHMD 50. Further, the customer identifier 40 may be configured to include a user selectable link or the like, which when activated by the employee/associate provides the employee//associate access to customer profile information stored by the business.

Figure 2:
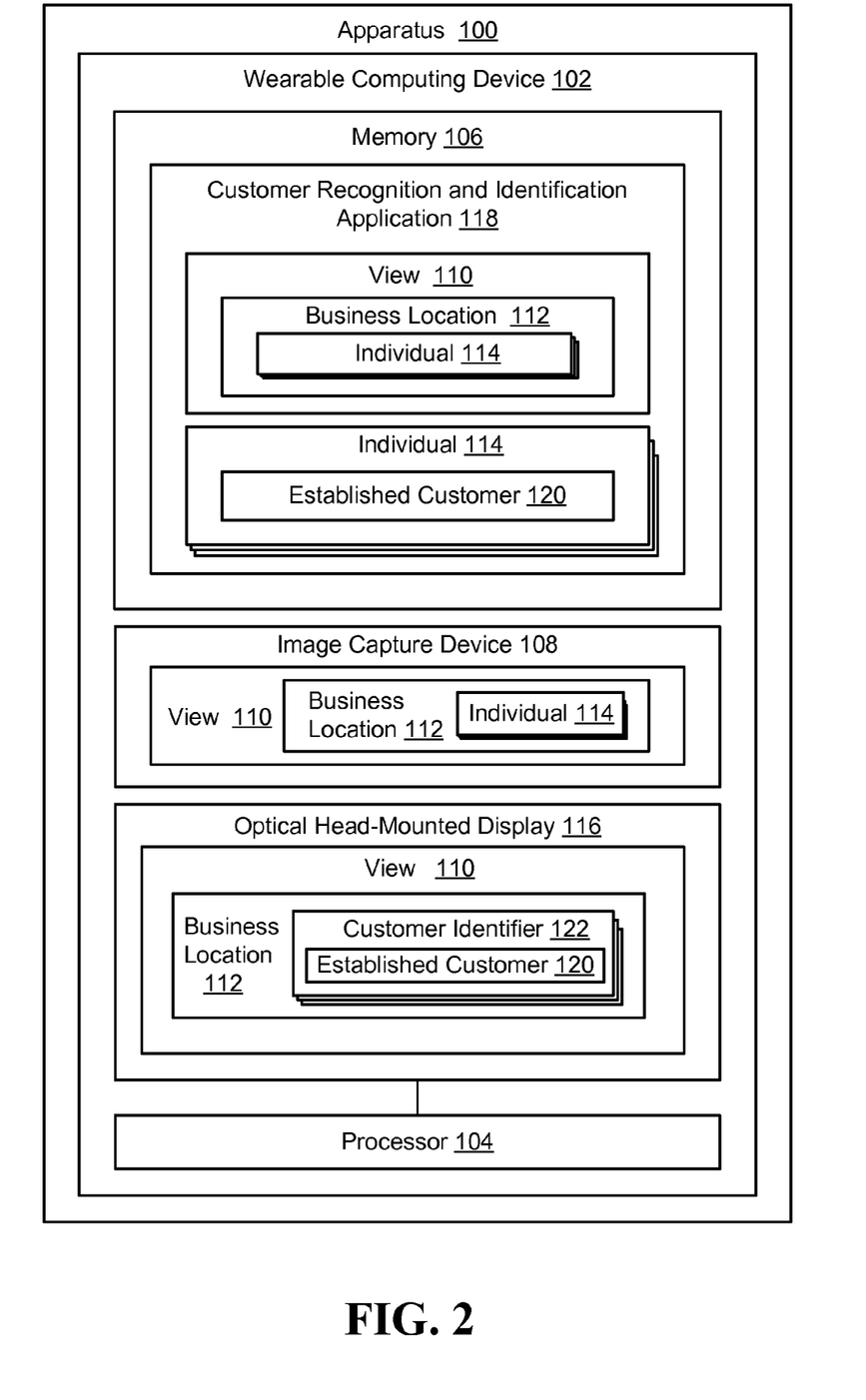
FIG. 2 provides a block diagram of an apparatus configured for automatically recognizing the presence of established customers within a business location and identifying the established customers within the view presented to a business associate/employee through the OHMD, in accordance with embodiments of the present invention.

Referring to FIG. 2, a block diagram is presented of an apparatus 100 configured for wearable computing device identification of established customers within a business location and identifying the established customers on an associated Optical head-Mounted Display (OHMD), in accordance with embodiments of the present invention. The system includes a wearable computing device 102 implemented on a computing platform that includes a memory 106 and at least one processor 104 in communication with the memory 14. Additionally, wearable computing device 102 may include an image-capturing device 108 that is in communication with processor 104 configured to capture the view 110 of the business location(s) 112 within the business occupied by individuals 114 (i.e., non-employees, such as new/potential customers and/or existing/established customers). In addition, wearable computing device 102 includes OHMD 116 that is in communication with the processor 104 and configured to display the view 110 of the business location 112 as captured by image-capturing device 108.

The memory 106 of wearable computing device 102 stores customer recognition and identification application 118 that is configured to receive the view 110 of the business location(s) 112 that are occupied by one or more individuals 114 and automatically identify/determine (without requiring any overt action by the individuals) which of the individuals 114 within the view 110 are established customers 120 of the business. In response to the identification/determination of established, the customer recognition and identification application 112 is further configured to present customer identifiers 122 in the view 110 of OHMD 116, which serve to identify those individuals that have been identified as established customers 120. In specific embodiments of the invention, the customer identifiers 122 are presented in the display 116 so to "attach" to a corresponding established customer 120. Attachment provides for the customer identifier 122 to follow the corresponding established customer 120 as the established customer moves within (and into and out of) the view 110 displayed on OHMD 116. In this regard, the attached customer identifier 122 provides for augmented reality environment within the view 110 of the OHMD 116, whereby individuals identified as established customers are continuously identified with the OHMD as such, thus allowing the employee/associate viewing the OHMD 116 to be constantly aware of which individuals within his/her view are established customers 120 and conversely, which of the individuals not identified are not established customers.

Figure 3:
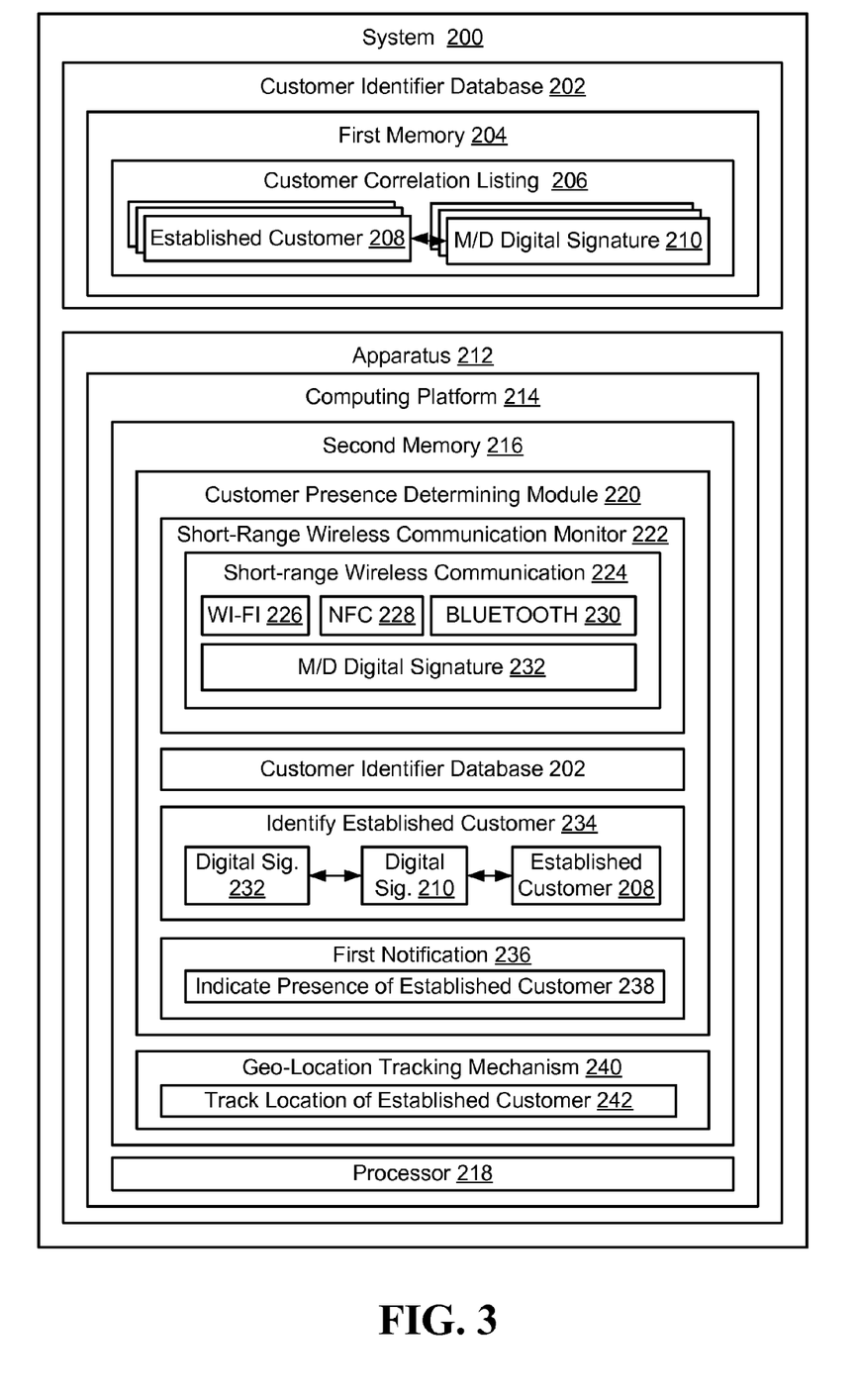
FIG. 3 provides a more block diagram of a system configured for automatically identifying the presence of an established customer based on receiving a digital signature associated with a mobile communication device known to be associated with the established customer, in accordance with present embodiments of the invention.

Referring to FIG. 3, a block diagram is presented of a system 200 configured for identification of the presence of established customers within a business location, in accordance with embodiments of the present invention. The system includes customer identifier database 202 that stores in first memory 204 a customer correlation listing 206 that correlates established customers to one or more digital signatures 208, otherwise referred to as digital tokens, linked to a mobile communication known to be associated with an established customer. The customer correlation listing 206 is established, over time, based on mobile interactions that the established customers conducts with the business, such as, but not limited to, customers making online purchases or otherwise interacting at the business' Internet site with a mobile communication device, customers downloading or interacting with a mobile application associated with the business (e.g., mobile banking application or the like). The mobile communication device may be a mobile telephone, a mobile pad computing device, a wearable communication device or the like.

The system 200 additionally includes apparatus 212 having a computing platform 214. The computing platform 214 is operable to receive and execute modules, routines and applications, such as customer presence determining module 220 and the like.

The computing platform 214 includes second memory 216, which may comprise volatile and nonvolatile memory such as read-only and/or random-access memory (RAM and ROM), EPROM, EEPROM, flash cards, or any memory common to computer platforms. Further, second memory 216 may include one or more flash memory cells, or may be any secondary or tertiary storage device, such as magnetic media, optical media, tape, or soft or hard disk.

Further, the computing platform also includes at least one processor 218, which may be an application-specific integrated circuit ("ASIC"), or other chipset, processor, logic circuit, or other data processing device. Processor 218 or other processor such as ASIC may execute an application programming interface ("API") layer (not shown in FIG. 3) that interfaces with any resident programs, such as customer presence determining module 220 or the like, stored in the second memory 216 of apparatus 212. Processor 218 includes various processing subsystems (not shown in FIG. 3) embodied in hardware, firmware, software, and combinations thereof, that enable the functionality of apparatus 212 and the operability of the apparatus on a network. For example, processing subsystems allow for initiating and maintaining communications, and exchanging data, with other networked devices. Additionally, processing subsystems may include any portion of the functionality of customer presence determining module 220 obviating the need for such applications and modules to be stored in the memory.

The second memory 216 of apparatus 212 stores customer presence determining module 220 that is configured to identify the presence of established customers at or proximate to a place of business, in accordance with embodiments of the present invention. The module 220 includes short-range wireless communication monitor 222 that is configured to monitor, in some embodiments continuously, an area within a place of business or an area proximate to a place of business for short-range wireless communication 224. The area within a place of business of business may be the area within a physical location occupied by the business, such as a retail location, banking center or the like. The area proximate to the place business may be a predetermined area surrounding a physical location occupied by the business or the area adjacent to a kiosk or automated teller machine associated with the business. The short-range wireless communication 224 signals that are being monitored may be one or more of WI-FI signals (2.4 GHz-5.0 GHz SHF ISM radio band) 226, Near Field Communication Signals (NFC) 228, BLUETOOTH (short-wavelength UHF radio waves in the ISM band 2.4 to 2.485 GHz) 230 or the like. The short-range wireless communication 224 signals that are being monitored will emanate from wireless communication devices in the possession of individuals located in the designated area. The short-range wireless communications 224 will include a digital signature 232 that is linked to the mobile communication device that communicated the signal. It should be noted that in certain instances the individual in possession of the mobile communication device is not required to activate or otherwise interface with the mobile communication device in order for the device to communicate the short-range wireless communication. For example, the mobile communication device may be configured to transmit WI-FI signals, NFC signals, BLUETOOTH signals or the like based on previous activation of such features on the mobile communication device. As such the present invention, provides for identifying the presence of an established customer without requiring an overt action on the part of the customer.

In response to receiving a short-range wireless communication 224 that includes a digital signature 232, the module 220 is configured to access the customer identifier database 202 to compare the digital signature 232 in the short-range wireless communication 224 to the digital signatures 210 in the listing 206. In response to the comparison determining that the digital signature 232 is within the listing 206, the established customer 208 is identified 234 based on their correlation in the listing 206 to the digital signature 210. In other instances in which the digital signature 232 in the short-range wireless communication 224 is determined not to be within the listing 206, an assumption can be drawn that the individual associated with the mobile communication device that communicated the digital signature 232 is not an established customer or cannot be otherwise confirmed as an established customer.

In response to identifying the established customer, the module 220 is configured to generate notification 236 and communicate the notification to at least one business entity that indicates the presence 238 he established customer within or proximate to the location of the business. The notification may in the form of an alert or may be a notification communicated to an ancillary graphical user-interface (GUI) application that tracks the presence of individuals within the business, i.e., indicates which individuals are established customers and, optionally, which individuals are not or cannot be confirmed as established customers.

In specific embodiments of the system 200, the apparatus 212 may additional include geo-location tracking mechanism 240 configured to track the location of the established customer 208 based on GPS signals or the like transmitted from the mobile communication device. Such, tracking of the location of the mobile communication device/established communication provides for identifying the location within or proximate to the business at which the established customer is currently located. As such, a GUI may be provided to an associate at the place of business to track the location of the established customer and otherwise identify who the established customer is from amongst other individuals located within or proximate to the business.

In additional embodiments of the system, once the module 220 has identified the presence of the established customer, the module 220 may access other databases to identify other information concerning the established customer. For example, the module 220 may access financial transaction history database to determine recent transaction history associated with the established customer. In one specific embodiment in which the recent transaction history indicates a recent (e.g., within a day, an hour or the like) financial transaction occurred at a location much different from the current location of the established customer (current location being at or near the place of business), such an indication may prompt automatic generation of a security alert that indicates the discrepancy between the location of the transaction and the current location of the established customer.

In other embodiments of the system, once the module 220 has identified the presence of the established customer, the module 220 may track the duration of the presence of the established customer at or near the place business. Tracking the duration of the presence may indicate how long the established customer was present at the place business and/or how long the established customer waited prior to being engaged or otherwise serviced at the business. Such tracking of the duration of presence of established may prompt the module 220 to generate and communicate notifications/alerts, such as if a maximum allowable duration of presence has been exceeded or the like.

Figure 4:
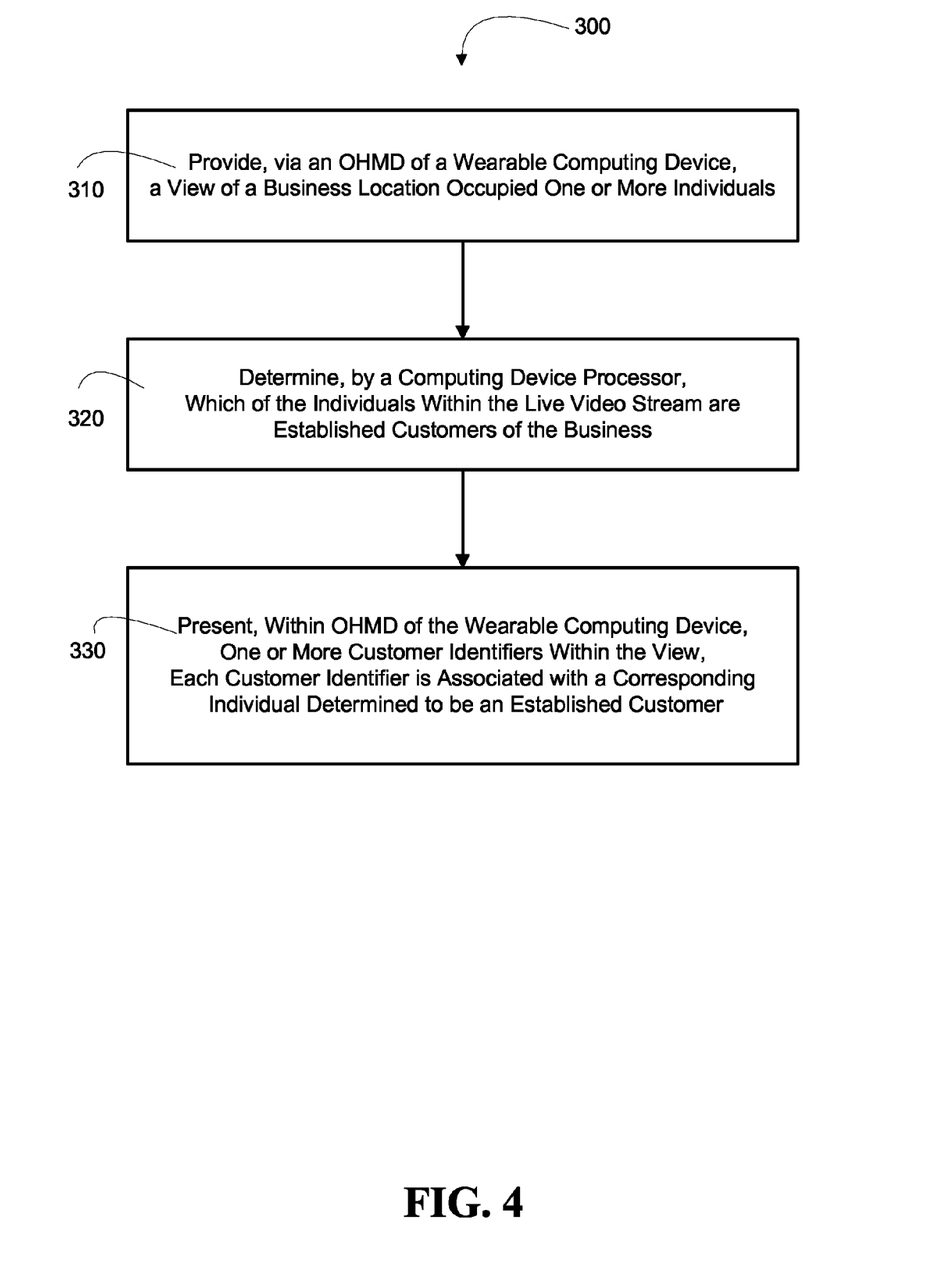
FIG. 4 provides a flow diagram of a method for automatically recognizing the presence of established customers within a business location and identifying the established customers within the view presented to a business associate/employee through the OHMD, in accordance with embodiments of the present invention.

Referring to FIG. 4, a flow diagram is presented of a method 300 for wearable computing device identification of established customers within a business location and identifying the established customers on an associated Optical head-Mounted Display (OHMD), in accordance with embodiments of the present invention. At Event 310, a view is provided, via an OHMD, of a business location, e.g., retail store, banking center or the like, that is occupied by one or more individuals. The individuals are non-employees and may be new or potential customers or pre-existing/established customers of the business.

At Event 320, a determination is made as to which of the individuals in the view are established customers of the business. In specific embodiments of the invention, the determination of established customers includes capturing, from an image capture device within the wearable computing device, facial images of the individuals and accessing a customer database that stores facial images of customers to compare characteristics of the facial images of the individuals in the live video stream to characteristics of the stored facial images of customers. Based on determining matches between the facial images of the individuals in the view to the stored facial images of customers, individuals within the view are identified as being established customers of the business.

In other embodiments of the invention, established customers are determined based on receipt of an electronic communication from a mobile communication device in possession of a corresponding individual displayed in the view. The electronic communication is communicated from the mobile communication device automatically without any overt action being taken by the individual in possession of the device and is communicated based on the mobile communication device being located within predetermined boundaries of the business location (i.e., "onsite" at the business location). In specific embodiments of invention, the electronic communication, itself, may identify the possessor of the mobile communication device as an established customer. For example, the electronic communication may comprise an electronic token, such as an electronic credit/debit card, that is issued or otherwise assigned by the business. The electronic token is stored at the Operating System (OS)-level within the mobile communication device and, as such, does not require the user to launch or have an application running in order to communicate the token. The electronic communication, in the form of a token or the like, may be broadcasted continuously or periodically from the mobile communication device, such as via wireless, cellular or short range wireless communication or the like, or in other embodiments of the invention the electronic communication may be communicated to the application in response to receiving a request from the application or from the business (i.e., another application). In such embodiments of the invention, the mobile communication device may be configured to receive the request based on the mobile communication device storing an business-related application, for example a mobile banking application associated with a financial institution/bank, a customer loyalty application associated with a store or the like. It should be noted that application is not required to be launched/running for the mobile communication device to receive the request, the mere presence of the application on the mobile communication device will allow for the device to receive the request. In other related embodiments of the invention, the electronic communication, itself, does not identify the possessor of the mobile communication device as an established customer but rather includes information about the individual that possesses the mobile communication device. In which case, a customer database may be accessed and the information included in the electronic communication is compared to customer information to determine if the individual that possesses the mobile communication device is an established customer of the business.

At Event 330, one or more customer identifiers are presented within the view displayed within the OHMD of the wearable computing device. Each of the customer identifiers corresponds to an individual in the view that has been determined to be an established customer. The customer identifier may be any graphical display that visually conveys to the user/employee/associate that the individual is an established customer, the identifier may serve to outline, make brighter, superimpose or the like the individual that has been determined to be an established customer. In specific embodiments of the invention, the customer identifiers "attach" to the corresponding individual/established customer, such that as the individual/established customer moves about within the view displayed by the OHMD, the customer identifier follows the individual/established customer, thereby creating an augmented reality environment within the OHMD. Further, the customer identifier may be configured to include a user selectable link or the like, which when activated by the user/employee/associate provides the user access to customer profile information stored by the business. Customer profile information may include, but is not limited to, a photograph of the customer, risk-related information, customer status, customer affinities, transaction conducted by the customer at the business, accounts held by the customer at the business and the like.

The following United States patent applications, which have been filed concurrently with the present application, are assigned to the same inventive entity as the present invention and include common inventors, are herein incorporated by reference as if set forth fully herein:

| Docket Number | U.S. Patent Application Ser. No. | Title | Filed On |
|---|---|---|---|
| 6131US1.014033.2196 | 14/251,351 | USER AUTHENTICATION BY OPERATING SYSTEM-LEVEL TOKEN | Apr. 11, 2014 |
| 133US1.014033.2193 | 14/251,291 | USER AUTHENTICATION BY TOKEN AND COMPARISON TO VISITATION PATTERN | Apr. 11, 2014 |
| 6134US2.014033.2192 | 14/250,972 | SECURITY MONITORING IMPLEMENTING CUSTOMER RECOGNITION VIA AN AUGMENTED REALITY DISPLAY | Apr. 11, 2014 |

Thus, systems, apparatus, methods, and computer program products described above provide for monitoring an area within or proximate to a place of business for digital signatures of mobile communication devices, such as cellular devices or wearable communication devices. The captured digital signatures are then matched to digital signatures associated with existing customers of the business to determine the presence of the existing customer within or proximate to the place of business. Once the presence of the existing customer within or proximate to the business is known, the business can access other relevant information, such as customer profile information, prior transaction/interaction information or the like to enhance the customer's current interaction with the business. Moreover, once the presence of the existing customer within or proximate to the business is known, location determining mechanisms may implemented to track the location of the known customer within or proximate to the place of business for the purpose of positively identifying the known customer.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for identifying a presence of established customers within or proximate to a location of a business, the system comprising:
    a customer identifier database that stores, in first memory, a listing that correlates established customers to one or more digital signatures, each digital signature linked to a mobile communication device known to be associated with an established customer;
    a computing platform having a second memory and at least one processor in communication with the second memory;
    a customer presence determining module stored in the second memory, executable by the processor and configured to:
        monitor an area within or proximate to the location of the business for short-range wireless communication signals that include digital signatures of mobile communication devices located within or proximate to the business location, wherein the monitoring comprises:
            transmitting, via short-range wireless communication, a request for electronic tokens issued to established customers by the business, and
            receiving, via short-range wireless communication, an electronic token communicated from a mobile computing device in possession of an established customer, wherein the electronic token includes a digital signature of the customer,
        in response to receiving the electronic token that includes the digital signature, access the customer identifier database to:
            compare the digital signature to the digital signatures in the listing, and
            in response to the comparison determining that the digital signature is within the listing, identify the established customer associated with the digital signature, and
        in response to identifying the established customer, communicate a first notification to at least one entity within the business that indicates a presence of the established customer within or proximate to the location of the business.

2. The system of claim 1, wherein the customer presence determining module is further configured, in response to identifying the established customer associated with the digital signature, track a geo-location of the established customer within or proximate to the location of the business.

3. The system of claim 2, wherein the customer presence determining module further comprises a user interface application that is configured to provide a user a display of the area within or proximate to the location of the business, wherein the display provides for tracking location of the established customer within the area.

4. The system of claim 1, further comprising a financial transaction database that includes financial transaction history for each of a plurality of established customers of the business and wherein the customer presence determining module is further configured to:
    in response to identifying the established customer associated with the digital signature, access the financial transaction database to identify at least a portion of the financial transaction history of the established customer, and
    communicate the first notification to the at least one entity within the business that additionally indicates information associated with the financial transaction history of the established customer.

5. The system of claim 4, wherein the customer presence determining module is further configured to, based on (1) the presence of the established customer within or proximate to the location of the business, and (2) the financial transaction history of the established customer, generate and initiate communication of a security alert that indicates a discrepancy between a location of one or more recent financial transaction conducted by the established customer and current presence of the established customer within or proximate to the location of the business.

6. The system of claim 1, wherein the customer presence determining module is further configured to in response to identifying the established customer, track a duration of the presence of the established customer within or proximate to the location of the business.

7. The system of claim 6, wherein the customer presence determining module is further configured to, in response to identifying the established customer and tracking the duration of the presence, communicate the first notification to at least one entity within the business that indicates a presence of the established customer within or proximate to the location of the business for a predetermined duration of time.

8. The system of claim 1, wherein the customer presence determining module is further configured to, in response to receiving the electronic token that includes a digital signature, access the customer identifier database to:
 compare the digital signature to the digital signatures in the listing, and
  in response to the comparison determining that the digital signature is not within the listing, identify a user associated with the digital signature as a potential new customer of the business, and
 in response to identifying the user as a potential new customer of the business, communicate a second notification to at least one entity within the business that indicates a presence of the potential new customer.

9. The system of claim 1, wherein the customer presence determining module is further configured to monitor the area within or proximate to the location of the business for short-range wireless communication signals that include digital signatures of mobile communication devices located within or proximate to the business location, wherein the electronic token is communicated from the mobile communication devices (1) absent user-input.

10. The system of claim 1, wherein the customer presence determining module is further configured to monitor the area within or proximate to the location of the business for short-range wireless communication signals that include digital signatures of mobile communication devices located within or proximate to the business location, wherein the mobile communication devices include wearable communication devices.

11. A computer-implemented method for identifying a presence of established customers within or proximate to a location of a business, the method comprising:
 monitoring, by a computing device processor, an area within or proximate to the location of the business for short-range wireless communication signals that include digital signatures of mobile communication devices located within or proximate to the business location, wherein monitoring comprises:
  transmitting, via short-range wireless communication, a request for electronic tokens issued to established customers by the business, and
  receiving, via short-range wireless communication, an electronic token communicated from a mobile computing device in possession of an established customer, wherein the electronic token includes a digital signature of the customer;
 in response to receiving the electronic token that includes the digital signature, accessing, by a computing device processor, a customer identifier database to compare the digital signature to a listing of digital signatures, wherein the listing correlates the digital signatures to established customers of the business;
 in response to the comparison determining that the digital signature is within the listing, identifying, by a computing device processor, the established customer correlated to the digital signature; and
 in response to identifying the established customer, communicating, by a computing device processor, a first notification to at least one entity within the business that indicates a presence of the established customer within or proximate to the location of the business.

12. The method of claim 11, further comprising, in response to identifying the established customer associated with the digital signature, tracking, by a computing device processor, a location of the established customer within or proximate to the location of the business.

13. The method of claim 11, wherein communicating further comprises generating a user-interface that displays the area within or proximate to the location of the business, wherein the user-interface is configured to track location of the established customer within the area.

14. The method of claim 11, further comprising, in response to identifying the established customer associated with the digital signature, accessing, by a computing device processor, a financial transaction database to identify at least a portion of financial transaction history associated with the established customer, and wherein communicating the first notification further comprises communicating, by the computing device processor, the first notification to the at least one entity within the business that additionally indicates information associated with the financial transaction history of the established customer.

15. The method of claim 11, further comprising:
 in response to identifying the established customer, tracking, by a computing device processor, a duration of the presence of the established customer within or proximate to the location of the business; and
 in response to identifying the established customer and tracking the duration of the presence, communicate the first notification to at least one entity within the business that indicates a presence of the established customer within or proximate to the location of the business for a predetermined duration of time.

16. The method of claim 11, further comprising:
 in response to receiving the electronic token that includes a digital signature, accessing, by a computing device processor, the customer identifier database to compare the digital signature to the digital signatures in the listing, and, in response to the comparison determining that the digital signature is not within the listing, identify a user associated with the digital signature as a potential new customer of the business; and
 in response to identifying the user as a potential new customer of the business, communicating, by a computing device processor, a second notification to at least one entity within the business that indicates a presence of the potential new customer.

17. A computer program product comprising:
 a non-transitory computer-readable medium comprising:
  a first set of codes for causing a computer to monitor an area within or proximate to the location of the business for short-range wireless communication signals that include digital signatures of mobile communication devices located within or proximate to the business location, wherein the monitoring comprises:

transmitting, via short-range wireless communication, a request for electronic tokens issued to established customers by the business, and receiving, via short-range wireless communication, an electronic token communicated from a mobile computing device in possession of an established customer, wherein the electronic token includes a digital signature of the customer;

a second set of codes for causing a computer to, in response to receiving the electronic token that includes the digital signature, access a customer identifier database to compare the digital signature to a listing of digital signatures, wherein the listing correlates the digital signatures to established customers of the business;

a third set of codes for causing a computer to, in response to the comparison determining that the digital signature is within the listing, identify the established customer correlated to the digital signature; and a fourth set of codes for causing a computer to, in response to identifying the established customer, communicate a first notification to at least one entity within the business that indicates a presence of the established customer within or proximate to the location of the business.

18. The computer-program product of claim 17, further comprising a fifth set of codes for causing a computer to, in response to identifying the established customer associated with the digital signature, track a location of the established customer within or proximate to the location of the business.

19. The computer program product of claim 17, further comprising a fifth set of codes for causing a computer to, in response to identifying the established customer associated with the digital signature, access a financial transaction database to identify at least a portion of financial transaction history associated with the established customer, and wherein the fourth set of codes is further configured to communicate the first notification to the at least one entity within the business that additionally indicates information associated with the financial transaction history of the established customer.

20. The computer program product of claim 17, further comprising a fifth set of codes for causing a computer to, in response to identifying the established customer, track a duration of the presence of the established customer within or proximate to the location of the business, and a sixth set of codes for causing a computer to, in response to identifying the established customer and tracking the duration of the presence, communicate the first notification to at least one entity within the business that indicates a presence of the established customer within or proximate to the location of the business for a predetermined duration of time.

* * * * *